(12) United States Patent (10) Patent No.: US 11,921,994 B2
Li et al. (45) Date of Patent: Mar. 5, 2024

(54) METHOD, APPARATUS, DEVICE, MEDIUM AND PROGRAM PRODUCT FOR REPLYING QUESTIONS

(71) Applicant: BEIJING BYTEDANCE NETWORK TECHNOLOGY CO., LTD., Beijing (CN)

(72) Inventors: Xiusong Li, Beijing (CN); Na Sun, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/157,613

(22) Filed: Jan. 20, 2023

(65) Prior Publication Data

US 2023/0161464 A1 May 25, 2023

Related U.S. Application Data

(63) Continuation of application No. 17/709,876, filed on Mar. 31, 2022, now Pat. No. 11,599,252.

(30) Foreign Application Priority Data

Sep. 24, 2021 (CN) .......................... 202111122963.5

(51) Int. Cl.
    *G06F 3/0484* (2022.01)
    *G06F 3/0481* (2022.01)
    *G06F 3/04883* (2022.01)

(52) U.S. Cl.
    CPC .......... *G06F 3/0484* (2013.01); *G06F 3/0481* (2013.01); *G06F 3/04883* (2013.01)

(58) Field of Classification Search
    CPC ... G06F 3/0484; G06F 3/0481; G06F 3/04883
    See application file for complete search history.

(56) References Cited

U.S. PATENT DOCUMENTS

| 8,819,719 B1 | 8/2014 | Chen et al. | |
| 9,906,485 B1 | 2/2018 | Ku et al. | |
| 2014/0229835 A1* | 8/2014 | Ravine | H04L 65/61 709/206 |
| 2015/0020170 A1* | 1/2015 | Talley | H04L 63/08 726/4 |
| 2015/0281643 A1 | 10/2015 | Calvagna | |

(Continued)

FOREIGN PATENT DOCUMENTS

| CN | 104113787 A | 10/2014 |
| CN | 107220387 A | 9/2017 |

(Continued)

OTHER PUBLICATIONS

International Search Report dated Oct. 26, 2022 in International Application No. PCT/CN2022/119589, with English translation (4 pages).

*Primary Examiner* — Mong-Shune Chung (57) ABSTRACT

The present disclosure provides a method, apparatus, device, medium and program product for replying questions. The method presents a reply viewing interface for a question to a user, the reply viewing interface including a first reply control; receives a first reply operation of the user based on the first reply control; publishes a first reply video according to the first reply operation, the first reply video being used for replying to the question.

10 Claims, 7 Drawing Sheets

(56) References Cited

U.S. PATENT DOCUMENTS

| | | | |
|---|---|---|---|
| 2015/0286958 A1* | 10/2015 | Liu | G06Q 50/205 |
| | | | 705/326 |
| 2017/0039867 A1* | 2/2017 | Fieldman | G09B 7/00 |
| 2017/0280189 A1 | 9/2017 | Ye et al. | |
| 2018/0205675 A1 | 7/2018 | Koo et al. | |
| 2019/0220522 A1* | 7/2019 | Yu | G06F 16/90332 |
| 2020/0034033 A1 | 1/2020 | Chaudhri et al. | |
| 2022/0318306 A1 | 10/2022 | Wu | |
| 2022/0365793 A1* | 11/2022 | Weiss | H04L 65/4015 |
| 2023/0013656 A1 | 1/2023 | Wu et al. | |

FOREIGN PATENT DOCUMENTS

| | | |
|---|---|---|
| CN | 109348299 A | 2/2019 |
| CN | 111078901 A | 4/2020 |
| CN | 113055709 A | 6/2021 |
| IN | 112698769 A | 4/2021 |

* cited by examiner

METHOD, APPARATUS, DEVICE, MEDIUM AND PROGRAM PRODUCT FOR REPLYING QUESTIONS

This application is a continuation of U.S. patent application Ser. No. 17/709,876, titled "A METHOD, APPARATUS, DEVICE, MEDIUM AND PROGRAM PRODUCT FOR REPLYING QUESTIONS" filed Mar. 31, 2022, which claims priority to China Patent Application No. 202111122963.5, titled "A METHOD, APPARATUS, DEVICE, MEDIUM AND PROGRAM PRODUCT FOR REPLYING QUESTIONS", filed on Sep. 24, 2021, the disclosure of which is incorporated by reference herein in its entirety.

TECHNICAL FIELD

The present disclosure relates to the field of computer technology, and in particular, to a method, apparatus, device, and computer-readable storage medium, computer program product for replying questions.

BACKGROUND

With the continuous development of computer technology, especially mobile internet technology, various applications (APPS) have emerged. As one of the entertainment-type applications, short video applications are getting more and more popular among users. The above short video applications can be installed on terminals such as mobile phones, and by running these short video applications, short videos can be published or played.

Currently, users can ask questions by publishing short videos, or they can reply questions by publishing short videos. In some examples, user 1 can publish a short video to ask question 1, and user 2 can publish a reply video for the question 1 to reply the question 1, and then user 3 can select a reply video from the user 2 or other user (e.g., user 4 or user 5) for the question 1 to play in a reply viewing interface for the question 1.

However, when the above user 3 has a need to reply for the question 1, the user 3 needs to trigger multiple return operations, so as to enable the short video application to return to the home page from the reply viewing interface, and then publish a reply video through a video publishing control in the home page to reply the above question 1, which is not only cumbersome to operate, but also inefficient to reply.

Therefore, the industry urgently needs a method for replying questions, which simplifies user operations and improves replying efficiency.

SUMMARY

The object of the present disclosure is to provide a method, apparatus, device, and computer-readable storage medium, computer program product for replying questions, so as to simplify user operations and improve replying efficiency.

In a first aspect, the present disclosure provides a method for replying questions, the method comprising:
    presenting a reply viewing interface for a question to a user, the reply viewing interface including a first reply control;
    receiving a first reply operation of the user based on the first reply control;
    publishing a first reply video according to the first reply operation, the first reply video being used for replying to the question.

In a second aspect, the present disclosure provides an apparatus for replying questions, comprising:
    a display module used to present a reply viewing interface for a question to a user, the reply viewing interface including a first reply control;
    a receiving module used to receive a first reply operation of the user based on the first reply control;
    a reply module used to publish a first reply video according to the first reply operation, the first reply video being used for replying to the question.

In a third aspect, the present disclosure provides a computer-readable medium having a computer program stored thereon, which, when executed by a processing apparatus, implements the steps of any one of the methods in the first aspect of the present disclosure.

In a fourth aspect, the present disclosure provides an electronic device, comprising:
    a storage apparatus having a computer program stored thereon;
    a processing apparatus used to execute the computer program in the storage apparatus, so as to implement the steps of any one of the methods in the first aspect of the present disclosure.

In a fifth aspect, the present disclosure provides a computer program product comprising instructions that, when running on a device, cause the device to perform the method described in any one of the implementations of the first aspect above.

Other features and advantages of the present disclosure will be described in detail in the following detailed description.

BRIEF DESCRIPTION OF THE DRAWINGS

In order to illustrate the technical methods of the embodiments of the present disclosure more clearly, the accompanying drawings required in the embodiments will be briefly introduced below.

DETAILED DESCRIPTION

The terms "first" and "second" in the embodiments of the present disclosure are only used for descriptive purposes, and should not be understood as indicating or implying relative importance or implying the number of indicated technical features. Thus, a feature defined with "first" or "second" may expressly or implicitly includes one or more of that feature.

First, some technical terms involved in the embodiments of the present disclosure are introduced.

As one of the entertainment-type applications, short video applications can provide users with functions such as publishing videos and playing videos. Based on this, users can ask questions through the way of videos, such as publishing question videos; similarly, users can also reply for the question videos through the way of videos, such as publishing reply videos, which are used to reply these questions carried in the question videos.

In some examples, user 1 can publish a question video, and user 2 can reply for the question carried in the question video, such as publishing a reply video, and user 3 can browse a reply video from user 2 or other user (e.g., user 4 or user 5) for the above question video in a reply viewing interface for the question.

However, when the above user 3 also needs to publish a reply video for the question video, user 3 needs to trigger a return operation, so that the short video application returns to the home page from the reply viewing interface, and then publishes the reply video through the video publishing control on the home page. This method is not only cumbersome to operate, but also inefficient to reply.

In view of this, an embodiment of the present disclosure provides a method for replying questions, the method can be executed by a client, and the client can be deployed on a terminal. Wherein, the terminal includes, but is not limited to, a mobile phone, a tablet, a notebook, a Personal Digital Assistant (PDA), or a smart wearable device, etc.

Specifically, the method comprises: presenting, by a client, a reply viewing interface for a question to a user, the reply viewing interface including a first reply control; receiving a first reply operation of the user based on the first reply control, and publishing a first reply video according to the first reply operation, the first reply video being used for replying the above question.

In this method, a reply control is included in a reply viewing interface for a question, based on which, a user can trigger a reply operation through the reply control in the reply viewing interface, without the need for the user to return to the home page from the reply viewing interface and then publish a reply video to reply above question through the reply control on the home page. In this way, with this method, the user can directly reply on the reply viewing interface, which not only simplifies operations of the user when replying, but also improves replying efficiency.

In order to make the technical solutions of the present disclosure clearer and easier to understand, the following describes a method for replying questions provided by an embodiment of the present disclosure from the perspective of a client.

Figure 1:
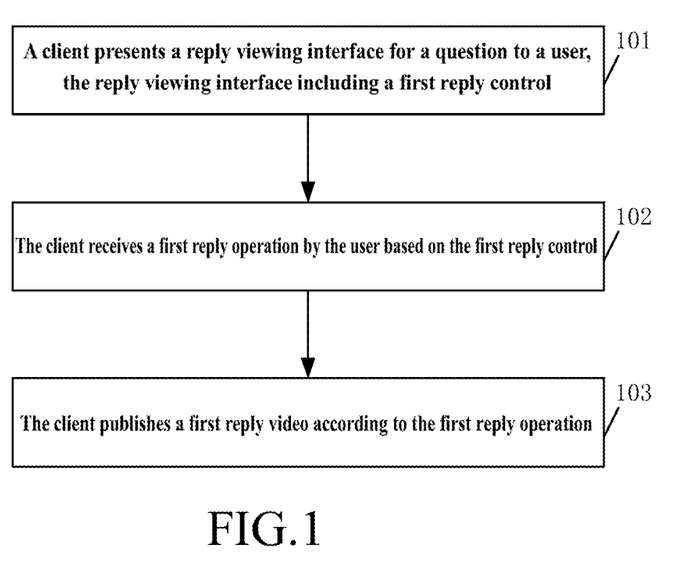
FIG. 1 is a flowchart of a method for replying questions provided by an embodiment of the present disclosure.

According to one aspect of the present disclosure, referring to the flowchart of a method for replying questions shown in FIG. 1, the method comprises:

S101: A client presents a reply viewing interface for a question to a user, the reply viewing interface including a first reply control.

The client can be installed on a mobile terminal such as a mobile phone, and the client can specifically be a client of a short video application. The reply viewing interface is used to view replies to the question (e.g., reply videos), and the reply viewing interface includes the first reply control, so that the user can reply to the question directly in the reply viewing interface through the first reply control.

Figure 2A:
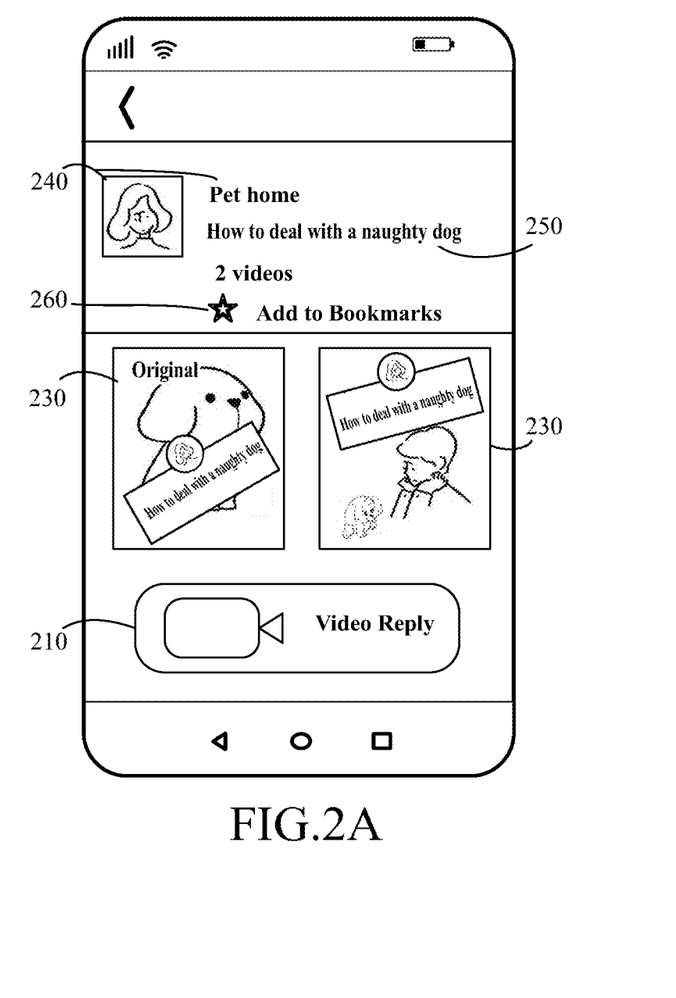
FIG. 2A-2D are schematic diagrams of a reply viewing interface provided by an embodiment of the present disclosure.

As shown in FIG. 2A, which is a schematic diagram of a reply viewing interface provided by an embodiment of the present disclosure. The reply viewing interface includes: a first reply control 210. Further, the reply viewing interface is also used to display a reply video 220 for a question, a question video 230 for the question, publisher information 240 of the question, text description 250 of the question, a bookmark control 260 and the like.

Wherein, the text description 250 of the question is used to describe the question, for example, the text description 250 of the question can be "how to deal with a naughty dog", and the publisher information 240 of the question is used to describe the publisher, for example, it can be an avatar, a nickname, etc. of the publisher. In the reply viewing interface, the user can click on the question video 230 to browse the question video 230; similarly, the user can also click on a cover of the reply video 220 (for example, an animation or picture of the video), to further browse the reply video for the question video 230.

In some scenarios, after the user has browsed the reply video 220 in the reply viewing interface, the user has an authoring need (for example, the user wants to publish a reply video to reply the question video), at this point, the user can directly click on the first reply control on the reply viewing interface to create the reply video. By directly clicking on the first reply control on the reply viewing interface to create a reply video, user operations are simplified, reply efficiency is improved, user needs are met, and user experience is improved.

It should be noted that FIG. 2A only takes the example that the first reply control 210 is located below the reply viewing interface for introduction. In other embodiments, the first reply control 210 may also be located at other positions in the reply viewing interface. In addition, the embodiment of the present disclosure does not specifically limit the style of the first reply control 210. For example, in order to make the reply viewing interface to have an esthetical appearance, the first reply viewing control 210 can be designed to be an icon including a camera or the like. Those skilled in the art can design the style of the first reply control 210 according to actual needs.

In other scenarios, after the publisher of a question has set the question to be in an invisible state, for example, after the publisher of the question has deleted the question or set the question to a hidden state (for example, set the question to be visible only to himself/herself, visible to some persons, etc.), the reply viewing interface is also used to hide the question video for the question and the publisher information of question when the question is in an invisible state.

Figure 2B:
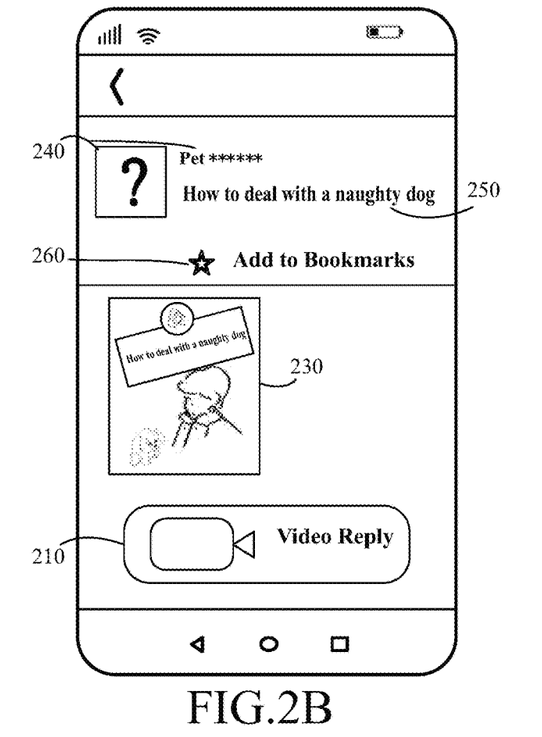

As shown in FIG. 2B, which is a schematic diagram of yet another reply viewing interface provided by an embodiment of the present disclosure. It can be seen from FIG. 2B that the publisher information 240 of the question has all become anonymous information. Specifically, the reply viewing interface hides the avatar and nickname of the publisher of the question. And, compared with FIG. 2A, when the question is in an invisible state, the reply viewing interface no longer displays the question video for the question.

It should be noted that, when the question has not yet been replied, the above reply viewing interface is used to display the question video 230 for the question, the publisher information 240 of the question, the text description 250 of the question, the bookmark control 260, etc., that is, the reply video is not displayed.

In some other embodiments, after the publisher of the question sets the question to an invisible state, the reply viewing interface for the question may be in an inaccessible state, that is, the client cannot enter the reply viewing interface. In some other alternative implementations, after the publisher of the question sets the question to an invisible state, the client may present feedback information on the reply viewing interface, for example, the feedback information may be "The current question is deleted or set as privacy".

Figure 2C:
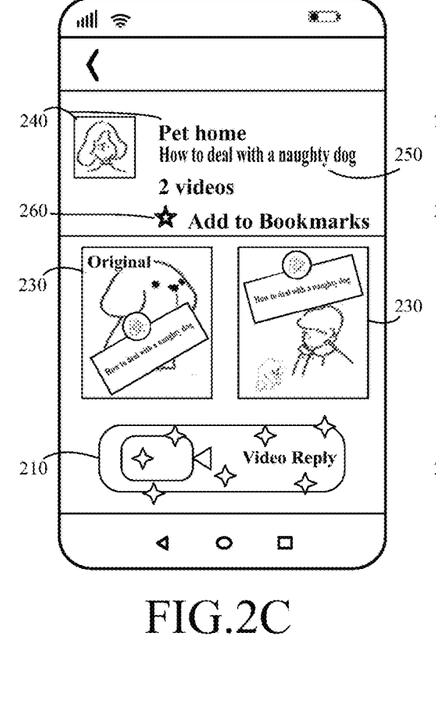

In some embodiments, the client may also present a preset motion effect for the first reply control, where the preset motion effect is used for guiding the user to pay attention to the first reply control. As shown in FIG. 2C, which is a schematic diagram of yet another reply viewing interface provided by an embodiment of the present disclosure.

The embodiment of the present disclosure does not specifically limit the preset motion effect, for example, the preset motion effect may be a gradient motion effect, a breathing motion effect, or the like. Those skilled in the art can select an appropriate motion effect according to actual needs.

It should be noted that, when presenting a second reply control, the client may also present a preset motion effect for the second reply control, and when presenting a third reply control, the client may also present a preset motion effect for the third reply control, and so on.

The client can present the above preset motion effect on the first reply control, and the preset motion effect can enhance the user's perception of the first reply control and guide the user to pay attention to the first reply control. Next, the user can trigger a first reply operation based on the first reply control according to the preset motion effect.

Figure 2D:
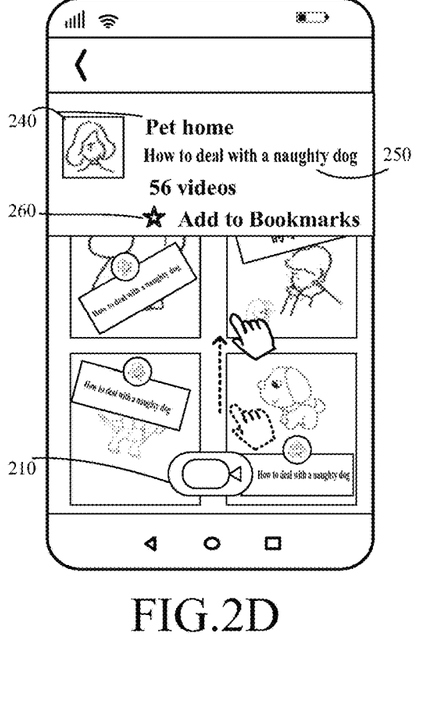

In some embodiments, the reply viewing interface may include multiple reply videos 220, as shown in FIG. 2D, which is a schematic diagram of a reply viewing interface provided by an embodiment of the present disclosure, and a user can trigger a sliding operation on the reply viewing interface, after receiving the sliding operation, the client changes the style of the first reply control. As shown in FIG. 2D, after the user triggers an upward slide operation (i.e., page down) on the reply viewing interface, the client changes the first reply control from the original combination of "icon and text" to "icon". In some other embodiments, the client may also change the first reply control to another style, which is not specifically limited in the present disclosure.

In some embodiments, the client may present the user with a display interface for the question, the display interface including a second reply control and an interactive question sticker. The user can trigger a second reply operation through the second reply control, or trigger a third reply operation through the question sticker; the user can also trigger a view operation through the question sticker, and then the client can present the user with the reply viewing interface for the above question according to the view operation, such as presenting FIG. 2A, FIG. 2B or FIG. 2C, which will be described below respectively.

Figure 3A:
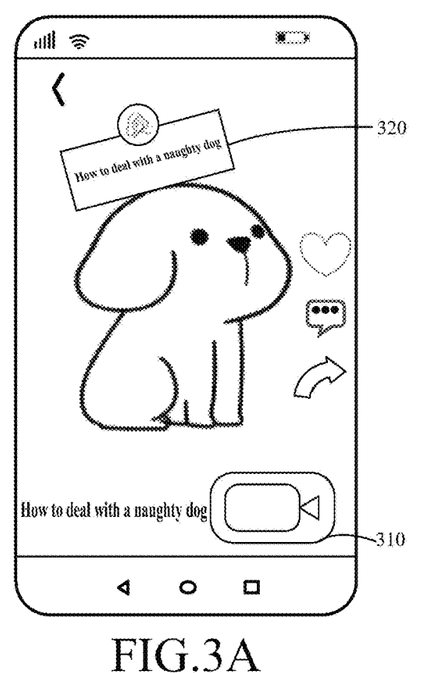
FIG. 3A-3B are schematic diagrams of a display interface provided by an embodiment of the present disclosure.

As shown in FIG. 3A, which is a schematic diagram of a display interface provided by an embodiment of the present disclosure. The display interface is used to display a question video for a question, and the display interface includes a second reply control 310 and an interactive question sticker 320 which is attached to the question video.

In some examples, the user can click on the second reply control 310 in the display interface to trigger a second reply operation, so that the client can publish a reply video after receiving the second reply operation.

Figure 3B:
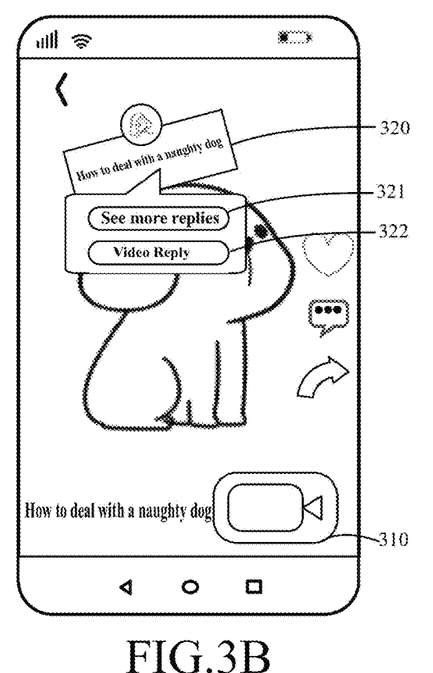

In some other examples, the user may click on the interactive question sticker 320, and after the user clicks on the question sticker 320, the client presents a plurality of candidate controls. As shown in FIG. 3B, the client may present a viewing control 321 and a third reply control 322.

The user can trigger a viewing operation through the viewing control 321, and after receiving the viewing operation, the client presents the user with the above reply viewing interface according to the viewing operation. The client changes from presenting the display interface shown in FIG. 3B to presenting the reply viewing interface shown in FIG. 2A, FIG. 2B or FIG. 2C.

The user can also trigger a third reply operation through the third reply control 322, so that the client can publish a reply video after receiving the third reply operation.

As it can be seen that the user can not only reply to the question video for the question in the reply viewing interface, but also can reply to the question video for the question in other interfaces, for example, reply to the question video for the question in the display interface directly. In addition, the user can trigger the second reply operation through the second reply control in the display interface, and can also trigger the third reply operation through the question sticker, which increases the convenience of triggering the reply operation, helps users further to publish reply videos, and improves the users' experience.

It should be noted that the functions of the above first reply control, second reply control and third reply control are similar. For the client, the first reply operation triggered by the user through the first reply control and the second reply operation triggered by the user through the second reply control and the third reply operation triggered by the user through the third reply control are similar. In some examples, the response made by the client according to the first reply operation and the response made by the client according to the second reply operation are the same, for example, the client in both situations will enter a video reply interface so as to publish a reply video.

In some examples, the user may click the bookmark control 260 in the reply viewing interface, and the client adds the question displayed in the reply viewing interface to a preset question set according to a bookmark operation triggered by the user on the bookmark control. Based on this, when replies to the question is updated, for example, when there is a new reply video for the question, the client can also send a prompt message to the user to prompt the user to browse the new reply video.

S102: The client receives a first reply operation by the user based on the first reply control.

In some examples, as shown in FIG. 2A or FIG. 2B, the user can trigger the first reply operation by clicking on the first reply control in the reply viewing interface, and then the client can receive the second reply operation by the user based on the second reply control.

It should be noted that, in this example, the second reply operation may be a first video reply made by the user directly on the display interface, or it may be a second video reply made by the user on the display interface after making the first video reply in the reply viewing interface. This embodiment of the present disclosure does not have limitation on this. The following third reply operation, fourth reply operation and fifth reply operation are the same.

In some other examples, as shown in FIG. 2C, the client may also present a preset motion effect for the first reply control, and through the preset motion effect, the user's perception of the first reply control can be enhanced, and then the user can trigger the first reply operation based on the first reply control according to the preset motion effect, and then the client can receive the first reply operation triggered by the user based on the first reply control according to the preset motion effect.

As described above, the client can receive not only the first reply operation, but also the second reply operation, a third reply operation, and so on. Wherein, the manners to trigger the first reply operation, the second reply operation and the third reply operation are different. Specifically, the first reply operation is triggered through the first reply control; the second reply operation is triggered through the second reply control; and the third reply operation is triggered through the question sticker, for example, after the user clicks on the question sticker, the client presents a third reply control, and the third reply operation is triggered through the third reply control.

Figure 4A:
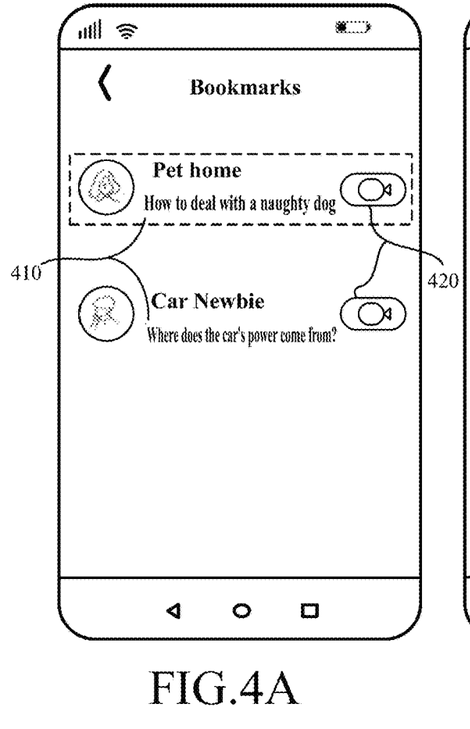
FIG. 4A-4C are schematic diagrams of a bookmark interface provided by an embodiment of the present disclosure.

In some embodiments, the user can also reply to a bookmarked question in the bookmark interface. As shown in FIG. 4A, which is a schematic diagram of a bookmark interface provided by an embodiment of the present disclosure. The bookmark interface is used to display bookmarked questions 410, the number of which can be one or more, for example, display publisher information of the bookmarked questions 410, text descriptions of the questions, and the like. FIG. 4A shows a bookmark interface including a plurality of bookmarked questions, and the bookmark interface also includes a plurality of fourth reply controls 420. Wherein, the number of fourth reply controls 420 and the number of bookmarked questions 410 are the same, and the fourth reply control 420 and the bookmarked question 410 are located in the same area (as shown in the dotted box in FIG. 4A). In some examples, when the user replies to the bookmarked question 410, the user can trigger a fourth reply operation through a fourth reply control 420 corresponding to the bookmarked question 410 to reply to the bookmarked question 410.

Figure 4B:
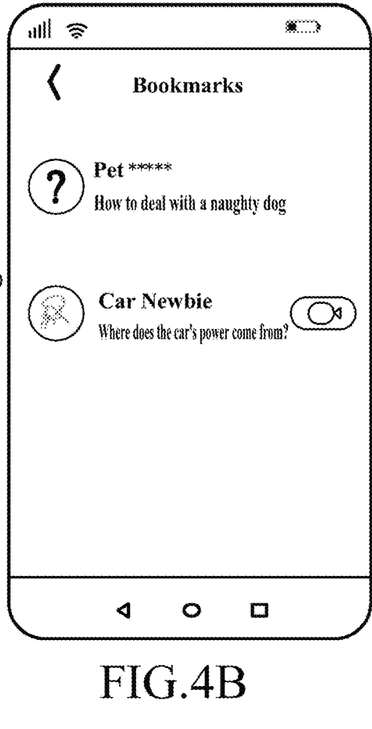

Continuing the above example, when the bookmarked questions in the bookmark interface are in an invisible state, the bookmark interface is also used to hide the bookmarked questions which are in the invisible state. In some examples, as shown in FIG. 4B, the bookmark interface can hide publishers information of the bookmarked questions, such as hiding images, nicknames, etc. of the publishers.

Figure 4C:
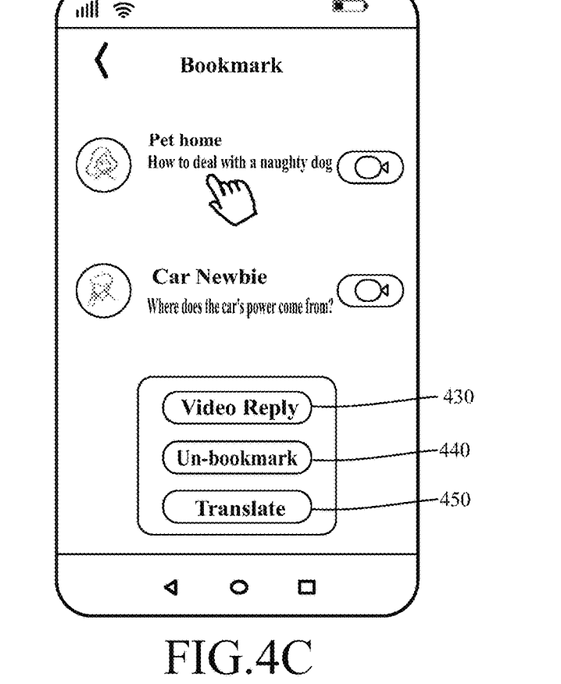

In some embodiments, a user may also perform a long-press operation on the bookmarked question 410 on the bookmark interface (for example, an operation that is held for more than 1 second). After receiving the long-press operation by the user, the client presents a plurality of candidate controls, as shown in FIG. 4C, the client presents a fifth reply control 430, an un-bookmark control 440, and a translation control 450. Wherein, the user may trigger a fifth reply operation through the fifth reply control 430, for example, the user clicks the fifth reply control 430 to trigger the fifth reply operation, and then the client receives the fifth reply operation. The user can un-bookmark one of the bookmarked questions 410 in the display interface through the un-bookmark control 440. The user can trigger a translation operation through the translation control 450, and then the client translates the text description of the bookmarked question 410 into a preset language according to the translation operation, for example, when the text description of the bookmarked question 410 is in English, the English will be translated into Chinese after the client receives the translation operation from the user; for another example, when the text description of the bookmarked question 410 is in Chinese, the Chinese will be translated into English after the client receives the translation operation from the user.

S103: The client publishes a first reply video according to the first reply operation.

Wherein, the first reply video is used to reply the above question. In some other examples, the client can also publish a second reply video according to a second reply operation triggered by the user, the second reply video being used to reply the above question; the client can also publish a third reply video according to a third reply operation triggered by the user, the third reply video being used to reply the above question. Similarly, the client can also publish a fourth reply video, a fifth reply video, and so on, according to a fourth reply operation, a fifth reply operation triggered by the user.

It should be noted that the above first reply video, second reply video, third reply video, fourth reply video, and fifth reply video can be the same reply video, or may be different reply videos.

For ease of understanding, the following takes the example that the client publishes a first reply video according to a first reply operation for introduction.

Figure 5A:
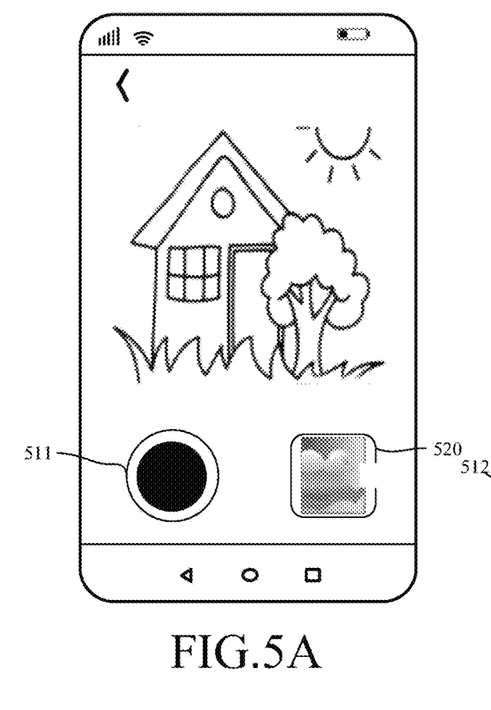
FIG. 5A is a schematic diagram of a video reply interface provided by an embodiment of the present disclosure.

After the user clicks the first reply control 210 as shown in FIG. 2A, the client can receive the first reply operation triggered by the user by clicking on the first reply control 210, and then the client presents a video reply interface to the user according to the first reply operation. As shown in FIG. 5A, which is a schematic diagram of a video reply interface provided by an embodiment of the present disclosure. The video reply interface includes a shooting control 511, a local browsing control 520, etc.

Figure 5B:
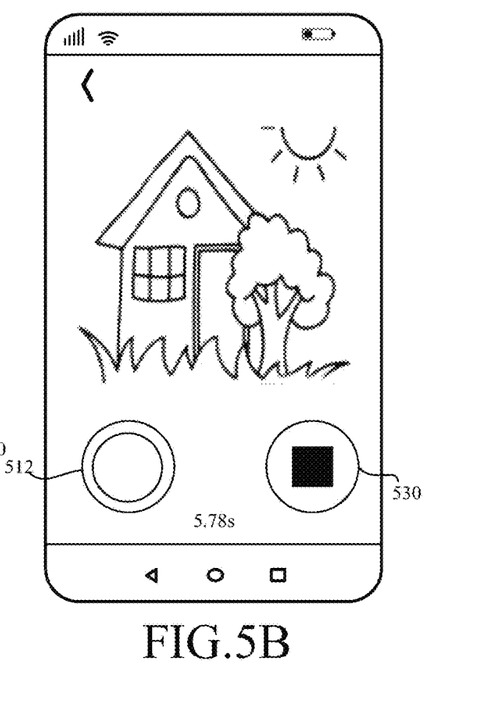
FIG. 5B is a schematic diagram of a shooting preview interface provided by an embodiment of the present disclosure.

In some examples, the user can trigger a shooting operation by clicking on the shooting control 510, and then the client enters a shooting preview interface according to the shooting operation, and starts to shoot video (e.g., capture video stream and audio stream). As shown in FIG. 5B, which is a schematic diagram of a shooting preview interface provided by an embodiment of the present disclosure. The shooting preview interface includes a pause control 512, an end control 530, etc.

Figure 5C:
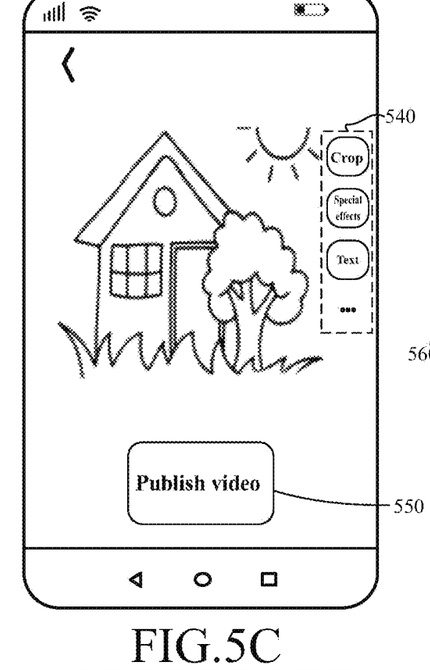
FIG. 5C is a schematic diagram of a video editing interface provided by an embodiment of the present disclosure.

Wherein, the pause control 512 is used to pause the shooting, and the end control 530 is used to end the shooting. For example, the user can trigger a pause operation by clicking on the pause control 512, and the client pauses video shooting according to the pause operation; the user can trigger an end operation by clicking on the end control 530, and the client ends video shooting according to the end operation, and then enters a video editing interface. As shown in FIG. 5C, which is a schematic diagram of a video editing interface provided by an embodiment of the present disclosure. The video editing interface includes an editing component 540 and a publishing control 550. The editing component 540 includes a plurality of editing controls, which are used to edit the video obtained by shooting, for example, the editing controls include a cropping control, a special effects control, a text control, etc.; the publishing control 550 is used to publish the video obtained by shooting, and the user can trigger a publishing operation by clicking on the publishing control, and then the client publishes the video obtained by shooting according to the publishing operation, for example, publishes a first reply video.

Figure 5D:
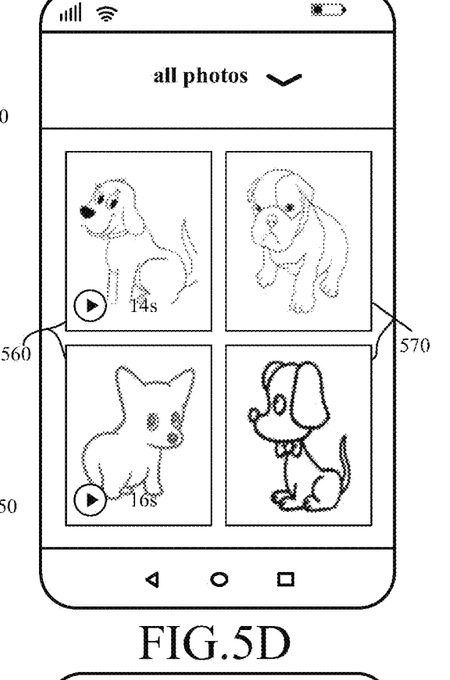
FIG. 5D is a schematic diagram of an album browsing interface provided by an embodiment of the present disclosure.

In some other examples, the user can trigger a browsing operation by clicking on the local browsing control 520, and then the client enters an album browsing interface according to the browsing operation, and presents local videos, local pictures, etc. in the album browsing interface. As shown in FIG. 5D, the album browsing interface is used to display candidate local videos 560 and candidate local pictures 570.

Taking the user selecting the candidate local video 560 as an example, the user can trigger a selection operation by clicking the candidate local video 560, and the client can enter a video editing interface according to the selection operation, such as enter the video editing interface as shown in FIG. 5C. Next, the user triggers a publishing operation by clicking on the publishing control 540, and the client publishes the selected local video according to the publishing operation, for example, publishes the first reply video.

It should be noted that the interactive question sticker is included in all the first reply video published by the above client. As such, other users can also reply to the question by clicking on the question sticker on the first reply video during the process of playing the first reply video, which further improves the convenience of replying, and attracts users to reply.

The principles that the client publishes a second reply video according to a second reply operation, a third reply video according to a third reply operation, a fourth reply video according to a fourth reply operation, and a fifth reply video according to a fifth reply operation are the same as that of the client publishes the first reply video according to the first reply operation, which will not be repeated here.

Figure 6A:
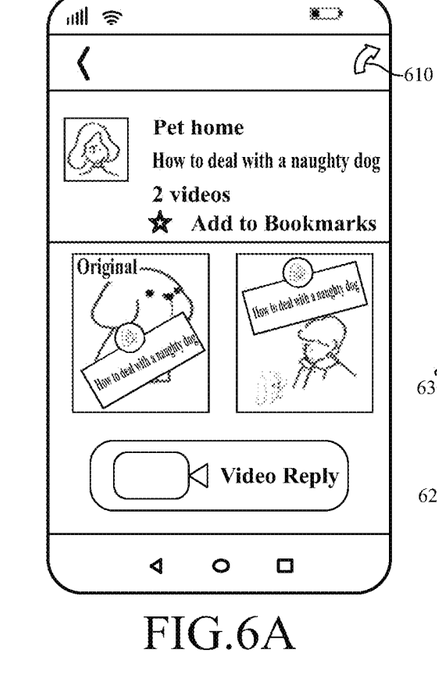
FIG. 6A is a schematic diagram of a reply viewing interface provided by an embodiment of the present disclosure.

In some embodiments, the reply viewing interface further includes a sharing control, as shown in FIG. 6A, which is a schematic diagram of a reply viewing interface provided by an embodiment of the present disclosure. The reply viewing interface further includes a sharing control on the basis of FIGS. 2A-2D. The share control 610 is used to share the question to other platforms or other users.

Figure 6B:
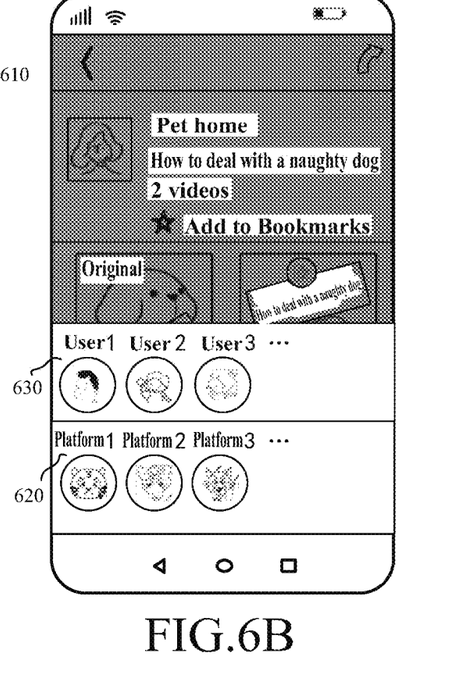
FIG. 6B is a schematic diagram of a sharing interface provided by an embodiment of the present disclosure.

In some examples, the user can trigger a sharing operation by clicking on the sharing control 610, and the client enters a sharing interface according to the sharing operation, as shown in FIG. 6B, which is a schematic diagram of a sharing interface provided by an embodiment of the present disclosure. The sharing interface includes candidate platforms 620, candidate users 630, and the like. The client can share the question to the selected platforms based on a selection operation of the user on the candidate platforms 620; or it can also share the question to the selected users based on a selection operation of the user on the candidate users 630.

After the client shares the question to other platforms, it can attract users of other platforms to reply the question, and in turn can guide users of other platforms to download and install the short video application, and thus further increasing the daily active users of the short video application.

Based on above description, in the method for replying questions provided by the embodiments of the present disclosure, a reply control is included in a reply viewing interface for a question, based on which, a user can trigger a reply operation through the reply control in the reply viewing interface, without the need for the user to return to the home page from the reply viewing interface and then publish a reply video to reply above question through the reply control on the home page. In this way, in this method, the user can directly reply on the reply viewing interface, which not only simplifies operations of the user when replying, but also improves replying efficiency. Further, the method supports users to reply questions in various interfaces, which improves convenience, and also supports users to share the question to other platforms to attract new users, so as to increase the daily active users of the short video application.

Figure 7:
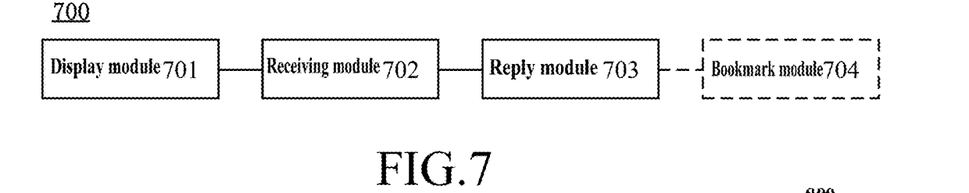
FIG. 7 is a schematic diagram of an apparatus for replying questions provided by an embodiment of the present disclosure.

FIG. 7 is a schematic diagram of an apparatus for replying questions according to an exemplary disclosed embodiment. As shown in FIG. 7, the apparatus for replying questions 700 comprises:

a display module 701 used to present a reply viewing interface for a question to a user, the reply viewing interface including a first reply control;

a receiving module 702 used to receive a first reply operation of the user based on the first reply control;

a reply module 703 used to publish a first reply video according to the first reply operation, the first reply video being used for replying to the question.

In some embodiments, the receiving module 702 is further used to receive a sliding operation triggered by the user on the reply viewing interface;

The display module 701 is specifically used to change the style of the first reply control according to the sliding operation.

In some embodiments, the display module 701 is further used to present a preset motion effect for the first reply control;

The receiving module 702 is specifically used to receive a first reply operation of the user based on the first reply control according to the preset motion effect.

In some embodiments, the reply viewing interface is used to display a question video for the question, a historical reply video for the question and publisher information of the question;

The reply viewing interface is further used to hide the question video for the question and the publisher information of the question when the question is in an invisible state.

In some embodiments, the display module 701 is further used to present a display interface for the question to the user, where the display interface includes an interactive question sticker;

The receiving module 702 is further used to receive a viewing operation triggered by the user based on the question sticker;

The display module 701 is specifically used to present a reply viewing interface for the question to the user according to the viewing operation.

In some embodiments, the display interface further includes a second reply control; the second reply control is used to trigger a second reply operation to publish a second reply video, which is used for replying to the question.

In some embodiments, the display module 701 is further used to present a display interface for the question to the user, where the display interface includes an interactive question sticker; the question sticker is used to trigger a third reply operation to publish the third reply video, which is used for replying to the question.

In some embodiments, the apparatus further includes a bookmark module 704, and the reply viewing interface further includes a bookmark control;

The bookmark module 704 is used to add the question displayed in the reply viewing interface to a preset question set according to a bookmark operation triggered by the user on the bookmark control.

The functions of above modules have been described in detail in the method steps in the previous embodiment, which will not be repeated here.

Figure 8:
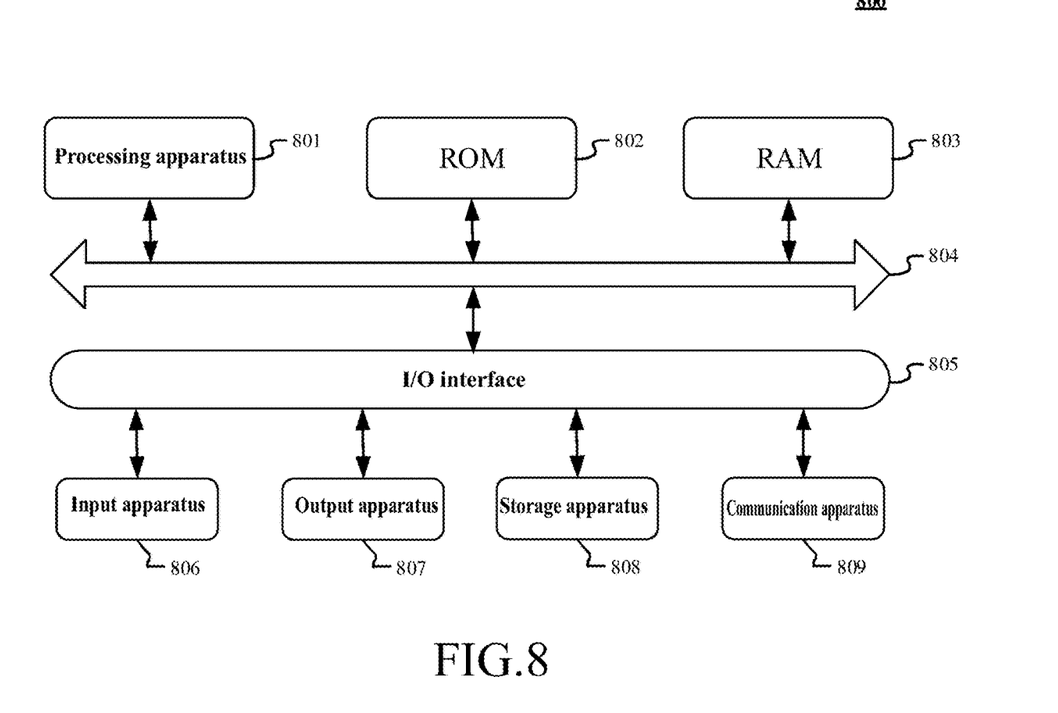
FIG. 8 is a schematic structural diagram of an electronic device provided by an embodiment of the present disclosure.

The following referring to FIG. 8, which shows a schematic structural diagram of an electronic device 800 suitable for implementing an embodiment of the present disclosure. The electronic device can be a terminal, which is used to implement the functions corresponding to the question replying apparatus 700 as shown in FIG. 7. The electronic device shown in FIG. 8 is only an example, and should not impose any limitation on the functions and usage scope of the embodiments of the present disclosure.

As shown in FIG. 8, an electronic device 800 may include a processing apparatus (e.g., a central processing unit, a graphics processor, etc.) 801 that can execute various appropriate actions and processes according to a program stored in a read only memory (ROM) 802 or a program loaded into a random access memory (RAM) 803 from a storage apparatus 808. In the RAM 803, various programs and data necessary for operations of the electronic device 800 are also stored. The processing apparatus 801, the ROM 802, and the RAM 803 are connected to each other via a bus 804. An input/output (I/O) interface 805 is also connected to bus 804.

Typically, the following apparatus can be connected to the I/O interface 805: an input device 806 including, for example, a touch screen, a touchpad, a keyboard, a mouse, a camera, a microphone, an accelerometer, a gyroscope, etc.; an output device 807 including, for example, a liquid crystal display (LCD), a speaker, a vibrator, etc.; a storage apparatus 808 including, for example, a magnetic tape, a hard disk, etc.; and a communication apparatus 809. The communication apparatus 809 may allow the electronic device 800 to communicate wirelessly or by wire with other devices to exchange data. While FIG. 8 shows the electronic device 800 having various apparatus, it should be understood that not all of the illustrated apparatus are required to be implemented or provided. More or fewer apparatus may alternatively be implemented or provided.

In particular, according to the embodiments of the present disclosure, the processes described above with reference to the flowcharts may be implemented as computer software programs. For example, an embodiment of the present disclosure include a computer program product comprising a computer program carried on a non-transitory computer readable medium, the computer program containing program code for performing the method illustrated in the flowchart. In such an embodiment, the computer program may be downloaded and installed from a network via the communication apparatus 809, or installed from the storage apparatus 808, or installed from the ROM 802. When the computer program is executed by the processing apparatus 801, above functions defined in the methods of the embodiments of the present disclosure are executed.

It should be noted that the above computer-readable medium in the present disclosure may be a computer-readable signal medium or a computer-readable storage medium, or any combination thereof. The computer-readable storage medium can be, for example, but not limited to, an electrical, magnetic, optical, electromagnetic, infrared, or semiconductor system, apparatus or device, or a any combination thereof. More specific examples of the computer readable storage media may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus, or device. While in the present disclosure, a computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, an electrical wire, an optical fiber cable, RF (radio frequency), etc., or any suitable combination thereof.

In some implementations, the client and server can use any currently known or future developed network protocol such as HTTP (HyperText Transfer Protocol) to communicate, and can interconnect with digital data communication (e.g., communication network) in any form or medium. Examples of communication networks include local area networks ("LAN"), wide area networks ("WAN"), the World-Wide-Web (e.g., the Internet), and peer-to-peer networks (e.g., ad hoc peer-to-peer networks), as well as any currently known or future developed networks.

The above computer-readable medium may be included in the above electronic device; or may exist alone without being assembled into the electronic device.

The above computer-readable medium carries one or more programs, which, when executed by the electronic device, cause the electronic device to: present a reply viewing interface for a question to a user, the reply viewing interface including a first reply control; receive a first reply operation of the user based on the first reply control; publish a first reply video according to the first reply operation, the first reply video being used for replying to the question.

Computer program code for performing operations of the present disclosure may be written in one or more programming languages or a combination thereof, including but not limited to object-oriented programming languages—such as Java, Smalltalk, C++, as well as conventional procedural programming languages—such as "C" language or similar programming languages. The program code can be executed entirely on a user's computer, partly on the user's computer, as a stand-alone software package, partly on the user's computer and partly on a remote computer, or entirely on the remote computer or server. In the case of a remote computer, the remote computer may be connected to the user's computer through any kind of network—including a local area network (LAN) or a wide area network (WAN), or, may be connected to an external computer (e.g., via an Internet connection using an Internet service provider).

The flowcharts and block diagrams in the Drawings illustrate architectures, functionalities, and operations of possible implementations of systems, methods and computer program products according to various embodiments of the present disclosure. In this regard, each block in the flowcharts or block diagrams may represent a module, program segment, or portion of code that contains one or more executable instructions for implementing the specified logical functions. It should also be noted that, in some alternative implementations, the functions labeled in the blocks may occur in different order than labeled in the drawings. For example, two blocks shown in succession may, in fact, be executed substantially concurrently, or they may sometimes be executed in the reverse order, depending upon the functionality involved. It is also noted that each block in at least one of the block diagrams or flowcharts, and a combination of blocks in at least one of the block diagrams or flowcharts, can be implemented in a dedicated hardware-based system that performs the specified functions or operations, or can be implemented in a combination of dedicated hardware and computer instructions.

The modules involved in the embodiments of the present disclosure may be implemented in software or hardware. Wherein, the name of a module does not constitute a limitation on the module itself under certain circumstances, for example, a first acquisition module may also be described as "a module for acquiring at least two Internet protocol addresses".

The functions described herein above may be performed, at least in part, by one or more hardware logic means. For example, without limitation, exemplary types of hardware logic means that may be used include: a Field Programmable Gate Array (FPGA), an Application Specific Integrated Circuit (ASIC), an Application Specific Standard Product (ASSP), a Systems on Chip (SOC), a Complex Programmable Logical Device (CPLD) and so on.

In the context of the present disclosure, a machine-readable medium may be a tangible medium that may contain or store a program for use by or in connection with a instruction execution system, apparatus or device. The machine-readable medium may be a machine-readable signal medium or a machine-readable storage medium. The machine-readable media may include, but are not limited to, electronic, magnetic, optical, electromagnetic, infrared, or semiconductor systems, apparatus, or devices, or any suitable combination thereof. More specific examples of machine-readable storage media would include one or more wire-based electrical connections, a portable computer disk, a hard disk, a random access memory (RAM), a read only memory (ROM), an erasable programmable read only memory (EPROM or flash memory), a fiber optics, a portable compact disk read only memory (CD-ROM), an optical storage apparatus, a magnetic storage apparatus, or any suitable combination thereof.

According to one or more embodiments of the present disclosure, Example 1 provides a method for replying questions, presenting a reply viewing interface for a question to a user, the reply viewing interface including a first reply control; receiving a first reply operation of the user based on the first reply control; publishing a first reply video according to the first reply operation, the first reply video being used for replying to the question.

According to one or more embodiments of the present disclosure, Example 2 provides the method of Example 1, the method further comprising:
receiving a sliding operation triggered by the user on the reply viewing interface;
changing the style of the first reply control according to the sliding operation.

According to one or more embodiments of the present disclosure, Example 3 provides the method of Example 1, the method further comprising:
presenting a preset motion effect for the first reply control;
the receiving the first reply operation of the user based on the first reply control includes:
receiving the first reply operation of the user based on the first reply control according to the preset motion effect.

According to one or more embodiments of the present disclosure, Example 4 provides the method of Example 1, the reply viewing interface is used to display a question video for the question, a historical reply video for the question, and publisher information of the question;
the reply viewing interface is further used to hide the question video for the question and the publisher information of the question when the question is in an invisible state.

According to one or more embodiments of the present disclosure, Example 5 provides the method of Examples 1-4, the method further comprising:
presenting a display interface for the question to the user, the display interface including an interactive question sticker;
receiving a viewing operation triggered by the user based on the question sticker;
the presenting the reply viewing interface for the question to the user includes:
presenting a reply viewing interface for the question to the user according to the viewing operation.

According to one or more embodiments of the present disclosure, Example 6 provides the method of Example 5, the display interface further includes a second reply control; the second reply control is used to trigger a second reply operation to publish a second reply video, the second reply video being used for replying to the question.

According to one or more embodiments of the present disclosure, Example 7 provides the method of Examples 1-4, the method further comprising:
presenting a display interface for the question to the user, the display interface including an interactive question sticker;
the question sticker is used to trigger a third reply operation to publish a third reply video, the third reply video being used for replying to the question.

According to one or more embodiments of the present disclosure, Example 8 provides the method of Example 1, the reply viewing interface further comprising a bookmark control;
according to a bookmark operation triggered by the user on the bookmark control, the questions displayed in the reply viewing interface are added into a preset question set.

According to one or more embodiments of the present disclosure, Example 9 provides an apparatus for replying questions, comprising: a display module used to present a reply viewing interface for a question to a user, the reply viewing interface including a first reply control; a receiving module used to receive a first reply operation of the user based on the first reply control; a reply module used to publish a first reply video according to the first reply operation, the first reply video being used for replying to the question.

According to one or more embodiments of the present disclosure, Example 10 provides the apparatus of Example 9, and the receiving module is further used to receive a sliding operation triggered by the user on the reply viewing interface;
the display module is specifically used to change the style of the first reply control according to the sliding operation.

According to one or more embodiments of the present disclosure, Example 11 provides the apparatus of Example 9, and the display module is further used to present a preset motion effect for the first reply control;
the receiving module is specifically used to receive a first reply operation of the user based on the first reply control according to the preset motion effect.

According to one or more embodiments of the present disclosure, Example 12 provides the apparatus of Example 9, the reply viewing interface is used to presenting a question video for the question, a historical reply video for the question, and publisher information of the question;

the reply viewing interface is further used to hide the question video of the question and the publisher information of the question when the question is in an invisible state.

According to one or more embodiments of the present disclosure, Example 13 provides the apparatus of Examples 9-12, the display module is further used to present a display interface for questions to the user, the display interface including an interactive question sticker;

the receiving module is further used to receive a viewing operation triggered by the user based on the question sticker;

the display module is specifically used to present a reply viewing interface for the question to the user according to the viewing operation.

According to one or more embodiments of the present disclosure, Example 14 provides the apparatus of Example 12, the display interface further includes a second reply control; the second reply control is used to trigger a second reply operation to publish a second reply video, the second reply video is used for replying to the question.

According to one or more embodiments of the present disclosure, Example 15 provides the apparatus of Examples 9-12, the display module is further used to present a display interface for questions to a user, the display interface including an interactive question sticker; the question sticker is used to trigger a third reply operation to publish a third reply video, the third reply video is used for replying to the question.

According to one or more embodiments of the present disclosure, Example 16 provides the apparatus of Example 9, the apparatus further comprising a bookmark module, the reply viewing interface further comprising a bookmark control;

the bookmark module is used to add the questions displayed in the reply viewing interface to a preset question set according to a bookmark operation triggered by the user on the bookmark control.

The above description is merely preferred embodiments of the present disclosure and an illustration of the technical principles employed. Those skilled in the art should understand that the scope of the disclosure involved in the present disclosure is not limited to technical solutions formed by a specific combination of the above technical features, and should also cover, without departing from the above disclosed concept, other technical solutions formed by any combination of the above technical features or its equivalent features. For example, a technical solution that is formed by replacing the above features with the technical features disclosed in the present disclosure (but not limited to) with similar functions.

Additionally, although operations are depicted in a particular order, this should not be construed as requiring these operations to be performed in the particular order shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in a language specific to structural features and/or logical acts of method, it is to be understood that the subject matter defined in the appended claims is not necessarily limited to the specific features or acts described above. Rather, the specific features and acts described above are merely example forms of implementing the claims. Regarding the apparatus in the above embodiments, the specific manner in which each module performs operations has been described in detail in the embodiments regarding the method, and thus will not be described in detail here.

What is claimed is:

1. A method for replying to an interactive sticker comprising:

presenting a display interface of a video to a user, the display interface including the interactive sticker;

receiving a viewing instruction based on a trigger on the interactive sticker;

presenting a reply viewing interface for the interactive sticker to the user according to the viewing instruction, the reply viewing interface including a first reply control;

receiving a first reply instruction of the user based on the first reply control;

acquiring and publishing a first reply video according to the first reply instruction, the first reply video being used for replying to the interactive sticker, wherein the interactive sticker is associated with publisher information of one or more publishers and a topic of the interactive sticker.

2. The method according to claim 1, the method further comprising:

receiving a sliding instruction on the reply viewing interface; and changing a style of the first reply control according to the sliding instruction.

3. The method according to claim 1, the method further comprising:

presenting a preset motion effect for the first reply control;

the receiving the first reply instruction based on the first reply control includes:

receiving the first reply instruction based on the first reply control according to the preset motion effect.

4. The method according to claim 1, wherein the reply viewing interface displays an original video, a historical reply video and publisher information of the interactive sticker.

5. The method according to claim 1, wherein the display interface further comprises a second reply control; the second reply control is used to trigger a second reply instruction to publish a second reply video, the second reply video being used for replying to the interactive sticker.

6. A non-transitory computer-readable storage medium having a computer program stored thereon, when the program is executed by a processing apparatus, implement the steps of the method according to claim 1.

7. A method for replying to an interactive sticker comprising:

presenting a display interface of a video to a user, the display interface including the interactive sticker;

receiving a video replying instruction based on a trigger on the interactive sticker;

presenting a video acquiring interface to the user according to the video replying instruction, the video acquiring interface including at least one acquiring control;

receiving an acquiring instruction based on the at least one acquiring control;

acquiring a first reply video according to the acquiring instruction;

publishing the first reply video according to the publishing instruction,
wherein the interactive sticker is associated with publisher information of one or more publishers and a topic of the interactive sticker.

8. The method according to claim 7, wherein the acquiring control includes a shooting control or an uploading control.

9. The method according to claim 7, wherein the video acquiring interface does not display a historical reply video.

10. A non-transitory computer-readable storage medium having a computer program stored thereon, when the program is executed by a processing apparatus, implement the steps of the method according to claim 7.

\* \* \* \* \*